Jan. 6, 1970　　　　　F. M. VEAZIE　　　　　3,488,723
ACOUSTICAL MATERIAL FOR HIGH TEMPERATURE APPLICATION
Filed July 5, 1966　　　　　　　　　　　　3 Sheets-Sheet 1
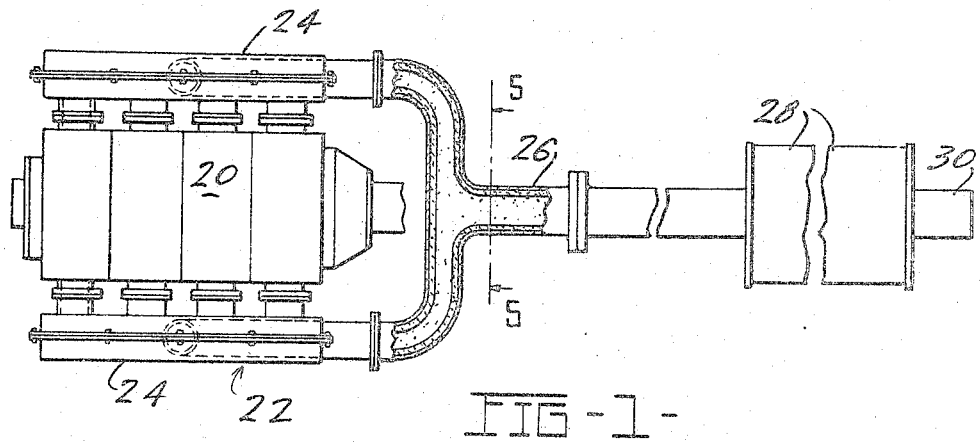
FIG-1-
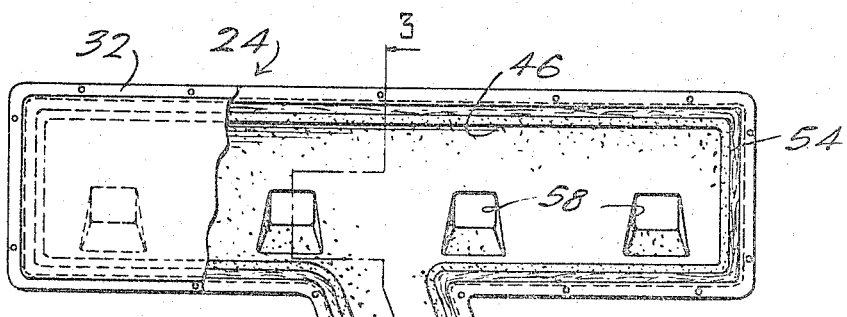
FIG-2-
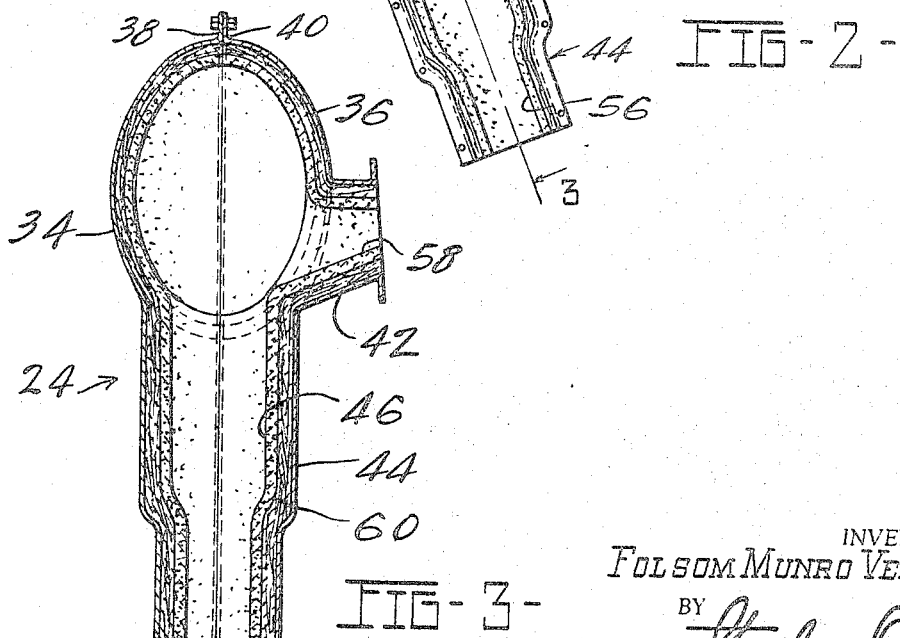
FIG-3-
INVENTOR:
FOLSOM MUNRO VEAZIE.
BY
ATT'YS.

Jan. 6, 1970  F. M. VEAZIE  3,488,723
ACOUSTICAL MATERIAL FOR HIGH TEMPERATURE APPLICATION.
Filed July 5, 1966  3 Sheets-Sheet 2
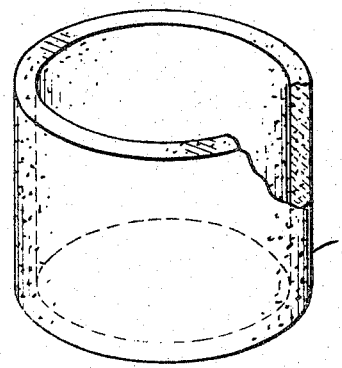
FIG-4-
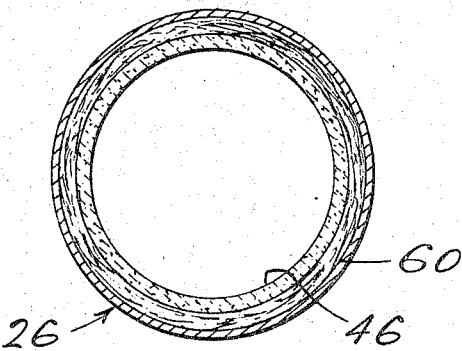
FIG-5-
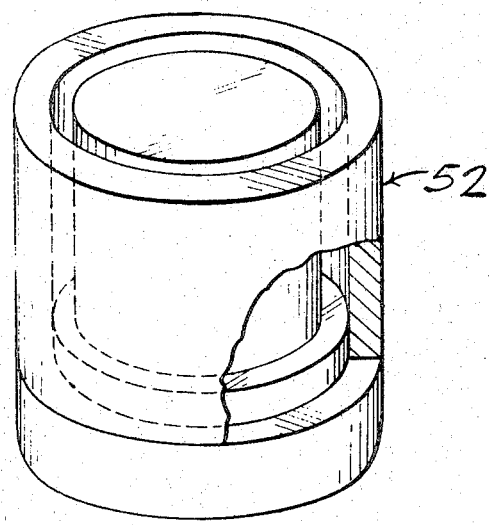
FIG-6-
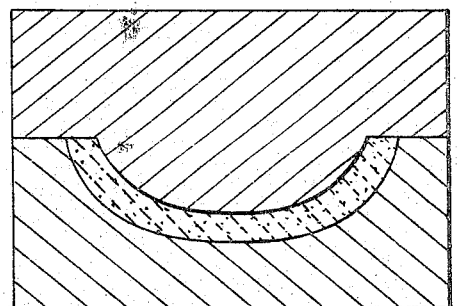
FIG-7-
INVENTOR:
FOLSOM MUNRO VEAZIE.
BY
ATT'YS

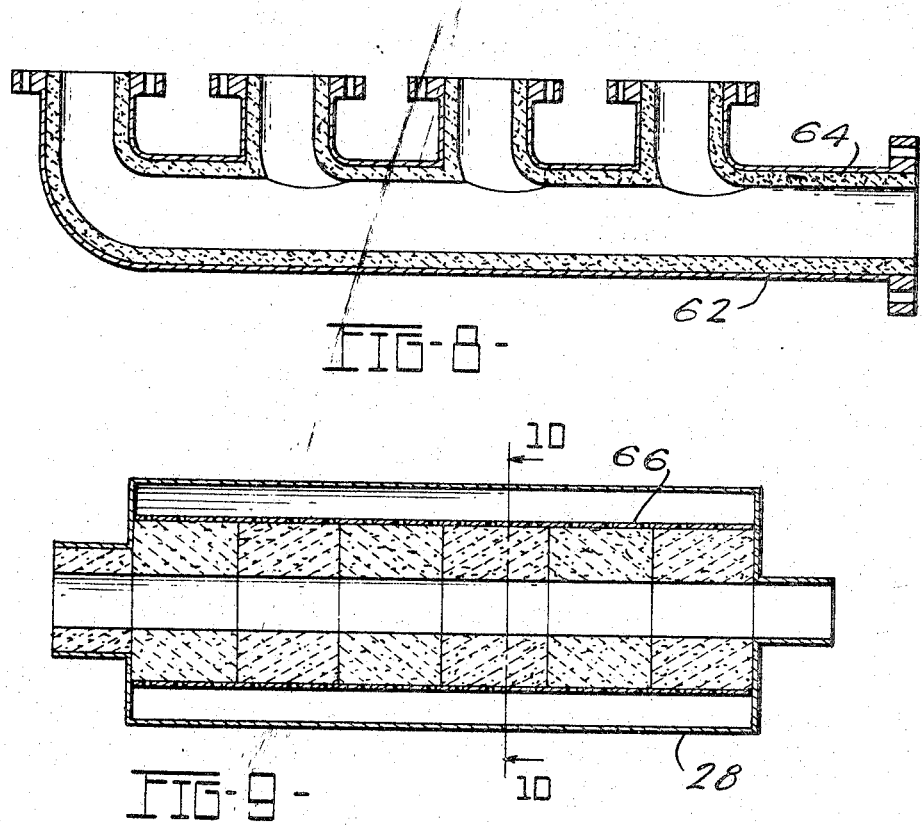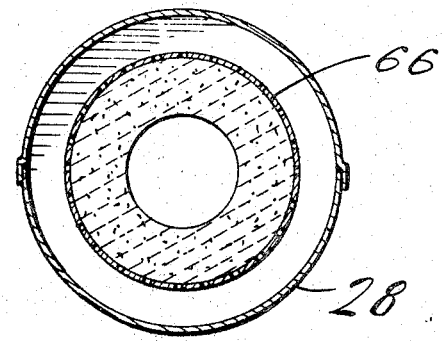

United States Patent Office 3,488,723
Patented Jan. 6, 1970

3,488,723
ACOUSTICAL MATERIAL FOR HIGH TEMPERATURE APPLICATION
Folsom M. Veazie, Granville, Ohio, assignor to Owens-Corning Fiberglas Corporation, a corporation of Delaware
Filed July 5, 1966, Ser. No. 562,859
Int. Cl. C04b 43/00; G10k 11/00
U.S. Cl. 252—62
10 Claims This invention relates to internal combustion engine exhaust systems, and more particularly to ceramic material suitable for use in lining such systems.

In recent years a major state has passed legislation relating to automobile exhaust systems in an effort to reduce the amount of pollution caused by automobiles, trucks, and the like, as a result of incompletely combusted fuel and fuel combustion by-products being expelled into the air through the exhaust. Other states and/or the federal government are expected to follow.

The bare metal walls of conventional exhaust manifolds, exhaust pipes and mufflers extract heat rapidly from the exhaust gases, thus causing the gases to cool quickly. Such cooling prevents secondary combustion in the exhaust system that might otherwise consume at least part of the carbon monoxide or other combustion by-products present. In present exhaust systems, secondary combustion is very rare and may only occur at high operating speeds when raw fuel and air flow through the exhaust system.

Intensive efforts have been made by automobile manufacturers and suppliers to develop inexpensive exhaust systems or individual components which would substantially eliminate the smog causing pollutants from being given off by automobiles, trucks, and the like.

The present invention relates to exhaust systems having lined components and to an insulating porous acoustical ceramic liner which at least partially overcomes the above-discussed disadvantages of existing exhaust systems. In particular it relates to a combination manifold-muffler having an insulating porous acoustical ceramic liner. The liner is made of a particulate material having a limited co-efficient of expansion held together by a suitable vitreous binder, the liner being located adjacent the inner surface of the component, between it and the exhaust gases. There is a much smaller tendency for condensation to occur with the exhaust components lined with the ceramic material of this invention because the exhaust gases are kept out of contact with the cold walls of the system, and because the liner remains hot longer after the engine is stopped. Any such liquid that does condense, as in winter when the engine is not operated for a long enough period to heat the liner sufficiently, will eventually evaporate in the exhaust gases and thereby be carried out of the exhaust system without doing any damage. The insulating liner also maintains the outer metal walls of the exhaust system components at much lower temperatures by comparison with conventional systems, the walls being approximately 500° F. or less when the exhaust gases are 1600° F. and a liner only one-half inch thick is used. The relatively cool walls thus tend to oxidize, rust and warp to a much smaller degree than formerly and no special steels are required for the combination manifold-muffler, exhaust manifold, exhaust pipe or other components as might otherwise be necessary. Reduction in heat loss from the manifold-muffler or other component under the hood also reduces driver discomfort in the summer when the manifold-muffler is lined in accordance with the invention. Because the insulating porous acoustical ceramic liner prevents rapid extraction of heat from the exhaust gases to the combination manigold-muffler or exhaust manifold and exhaust pipe walls, the exhaust gases remain at much higher temperatures so that secondary combustion can proceed in the system. To aid in secondary combustion, air can be added to the exhaust gases at a point upstream of the lined component to provide additional oxygen for combustion of the remaining fuel in the exhaust gases.

In another embodiment the present invention relates to a substantially non-acoustical insulating ceramic material suitable for use as a lining material for an exhaust manifold or exhaust pipe in order that exhaust gases might be maintained at a higher temperature level for a longer period of time, than with conventional unlined exhaust systems.

In still another embodiment this invention relates to a porous acoustical ceramic material suitable for use as a liner in a muffler component to improve noise suppression.

It is an object of this invention to provide a substantially non-acoustical insulating ceramic material suitable for use as a lining in an exhaust manifold or exhaust pipe component of an exhaust system.

It is a further object of this invention to provide an insulating porous acoustical ceramic material suitable for use as a lining in a combination manifold-muffler or exhaust pipe component of an exhaust system.

It is a still further object of this invention to provide an improved porous acoustical ceramic material suitable for lining a muffler component of an exhaust system.

It is a still further object of this invention to provide an exhaust manifold lined with an insulating ceramic material.

It is still another object of this invention to provide an exhaust manifold, combination manifold-muffler, and an exhaust pipe in which gases passing through are maintained at higher temperatures so that additional, secondary combustion can occur therein.

It is a still further object of this invention to provide a combination manifold-muffler lined with an insulating porous acoustical ceramic material and having a glass fiber backing interposed between the acoustical ceramic material and the shell of the manifold-muffler.

Other objects and advantages of the invention will be apparent from the following detailed description of preferred embodiments thereof, reference being made to the accompanying drawings, in which:

FIG. 1 is a somewhat schematic view, with parts broken away and parts in cross section, of an engine and an exhaust system embodying the principles of the invention;

FIG. 2 is an enlarged view with parts in cross section of a combination manifold-muffler of the system shown in FIG. 1;

FIG. 3 is a view in transverse cross section taken along the line 3—3 of FIG. 2;

FIG. 4 is a view in perspective of a liner segment used in the exhaust pipe of FIG. 1;

FIG. 5 is a view in transverse cross section through the line 5—5 of FIG. 1;

FIG. 6 is a perspective view of a mold for making the liner segment shown in FIG. 4;

FIG. 7 is a view in vertical cross section of a mold for making a non-cylindrical ceramic liner segment;

FIG. 8 is a cross-sectional view of an exhaust manifold embodying the principles of the invention;

FIG. 9 is a view in cross section of an enlarged scale of the muffler shown in FIG. 1; and FIG. 10 is a view in cross section taken along the line 10—10 of FIG. 9.

Referring to FIG. 1, the cylinders of an eight cylinder engine indicated at 20 are connected to an exhaust system indicated generally at 22. The system 22 includes a lined combination manifold-muffler 24, and a lined exhaust pipe 26. In one embodiment of the invention it may also include a muffler 28, and a tailpipe 30.

The combination manifold-muffler 24 (FIGS. 1, 2, and 3) includes a casing 32 which can be cast iron, aluminum, or fabricated from steel. The casing comprises two half sections 34 and 36 (FIG. 3) which can be bolted together at flanges 38 and 40 (FIG. 3) extending longitudinally thereof. The manifold-muffler contains exhaust risers 42, one of which corresponds to each cylinder on the side of the engine on which it is placed, and a connecting pipe 44 affixed generally in the midsection thereof for connection with the exhaust pipe 26 or tail pipe in a manner well known in the art. Within the manifold-muffler casing 32 is an insulating porous acoustical ceramic liner 46 of the type hereinafter described. The liner 46 is made by means of a press mold 48 (FIG. 7) in which half sections are formed. Two half sections are preferably cemented together by appropriate bonding cement to form the complete liner. If a cylindrical liner is desired, it can be formed of a plurality of ring segments 50 (FIG. 4) which are placed in coaxial, end to end relationship. The ring segments 50 can be formed in a rubber mold 52 (FIG. 6) by pouring a liquid slurry of the ceramic material into the space provided, allowing it to set, and then pulling the rubber mold away therefrom. The cylindrical liner is particularly suitable for use inside the exhaust pipe 26. The walls of the liner preferably are at least ¼ inch thick to provide reasonable strength and have been made in thicknesses up to approximately ¾ inch of the insulating porous acoustical ceramic material of the type described herein. Situated at each end of the manifold-muffler is a round acoustical ceramic end cap 54 (FIG. 2) to protect the ends of the manifold-muffler from direct exposure to exhaust gases. A truncated cylinder 56 lines the connecting pipe 44 and each exhaust riser 42 is also lined with a rectangular piece of insulating porous acoustical ceramic liner 58.

In a preferred embodiment of this invention, the insulating porous acoustical ceramic material described herein has an air space between it and the metal skin of the manifold-muffler or exhaust pipe component of the exhaust system. The air space has been found extremely beneficial in aiding sound attenuation in the combination manifold-muffler. It also protects the liner to a certain extent from mechanical shock, vibrations and thermal stress. Preferably, the air space will be about ¼ inch wide, but it can vary depending on the size and volume of the combination manifold-muffler or other component used.

In the optimum embodiment of this invention, the insulating porous acoustical ceramic material described herein has a glass fiber backing or layer between it and the metal skin of the manifold-muffler or exhaust pipe component of the exhaust system, i.e., the glass fiber backing occupies the air space referred to above. The liner serves as thermal insulation and protects the insulating porous acoustical ceramic material from mechanical shock and vibrations and thermal stress, and also aids in sound attenuation. This layer of glass fiber matting can be of any desired thickness. Good results have been obtained, however, using a compressed glass fiber mat of approximately ¼ inch thickness (e.g., a glass fiber mat wherein the fibers are made of Glass "C" subsequently identified). FIG. 3 shows a cross section of an automobile manifold-muffler 24 wherein an insulating porous acoustical ceramic material 46 having a glass fiber mat backing 60 is used as a lining material. The glass fiber backing 60 completely surrounds the insulating porous acoustical ceramic liner 46.

A preferred type of glass fiber mat for use in this invention is one where the glass fibers have been treated with a coating to improve the high temperature properties thereof. Coatings consisting of the oxides or silicates of chromium, aluminum, zirconium, titanium, beryllium or magnesium and constituting from about 3 to about 50 percent of the weight of the fibers and the coating, are particularly advantageous. When still greater resistance to high temperatures is desired, mats of substantially pure silica fibers can be used, and most desirably coated with one of the indicated oxides or silicates as described in U.S. Patent No. 3,232,782: Shannon. Other coatings can be used to improve the high temperature properties of glass or silica fibers, e.g., as disclosed in U.S. Patent No. 2,901,379: Shannon and Mitchell. It is intended the the disclosures of the Shannon and Shannon and Mitchell patents be incorporated herein by reference. The coating of the fibers significantly raises the strength properties at high temperature, making fiber mats particularly suitable for use in lining automobile exhaust systems. Optimum results have been achieved with glass fiber mats in which the fibers are treated with chromium sulfate. The chromium sulfate serves as a sizing for the glass fibers, serves to bind the fibers together, and also have the property of increasing the heat resistance of the fibers, probably occurring as an oxide at high temperatures. Optimum results have been achieved using a mat of silica fibers which have been treated as described above. Even better high temperature strength properties are obtained thereby.

When mats of glass or silica fibers are used as a cushion between the insulating porous acoustical ceramic material and the wall of the combination manifold-muffler or other component, it is then possible to cast the component shell around the glass or silica fiber mat with the insulating porous acoustical ceramic liner already in place inside the fiber matting. This not only makes the shell cheaper to make, but solves the sometimes difficult problem of placing the insulating porous acoustical ceramic liner within the shell after it has been formed. Moreover, there is much less tendency for the insulating porous acoustical ceramic liner to crack during the manufacturing operation if the metal shell is cast around the ceramic component, than if the ceramic component is mechanically inserted into the shell.

When a glass or silica fiber mat is used as a backing material, good results have been obtained when the mat is approximately ¼ inch thick and the insulating porous acoustical ceramic liner is ¼ inch thick. The mat should also be sufficiently compressible to absorb any expansion which the insulating porous acoustical ceramic liner might undergo during use. Generally, the mats will have a density of about 5–7 lbs. per cubic foot.

A fiber mat lining (FIG. 3) of the type herein described is shown interposed between the insulating porous acoustical ceramic liner and the casing of the manifold-muffler, providing protection against mechanical and thermal shock; and the combination manifold-muffler with a glass fiber mat lining represents the most preferred embodiment of this invention.

That the provision of a space barrier between the insulating acoustical ceramic liner and the outside shell of the manifold-muffler improves the sound absorption, and that the packing of the space with glass fiber insulation improves it even more is demonstrated in the following example.

EXAMPLE I

A hollow cylindrical metal shell was obtained and one end closed off. On the outside of the closed end a microphone was attached. Various samples of the insulating porous acoustical ceramic material of this invention were produced,[1] each sample being circular in shape and having a diameter of 3.92" which was equal to the inside diameter of the metal cylinder, and of varying thickness. Each sample was then placed inside the cylinder, first in contact with the closed end, then with a ¼ inch air space therebetween, and thereafter with the air space filled with glass fiber insulation. In each instance sounds of variable frequency were directed through the ceramic sample and picked up by the microphone attached to the outside end of the cylinder. The diminution of sound was then measured.

The samples tested had the following characteristics:

| Sample: | Thickness | Flow resistance (rayls/in.) | C.f.m.[1] for P,[2] .5" H₂O (area 6 sq. in.) |
|---|---|---|---|
| 1 | ⁵⁄₁₆ | | |
| 2[3] | ⅜ | | |
| 3[4] | ⁵⁄₁₆ | | |
| 4 | ¼ | 33 | 14.4 |
| 5 | ¼ | 20 | 24.3 |
| 6 | ¼ | 14 | 34 |
| 7 | ¼ | 24 | 20 |
| 8 | ¼ | 30 | 16.3 |

[1] C.f.m.=cubic feet per minute.
[2] P=pressure.
[3] Composition of Example III.
[4] Composition of Example III except that silica was −100+200 mesh.

The results (normal incidence sound absorption coefficients) were as follows:

TABLE I

| Sample | Frequency, c.p.s.[1] (hundreds) | Solid backing | ¼" air space | Glass fiber ¼" insulation |
|---|---|---|---|---|
| 1 | 250 | .04 | .09 | .09 |
| 1 | 500 | .05 | .13 | .19 |
| 1 | 1,000 | .11 | .39 | .42 |
| 1 | 1,500 | .22 | .52 | .50 |
| 1 | 2,000 | .39 | .55 | .53 |
| 2 | 250 | .05 | .08 | .09 |
| 2 | 500 | .09 | .13 | .14 |
| 2 | 1,000 | .17 | .18 | .17 |
| 2 | 1,500 | .22 | .22 | .22 |
| 2 | 2,000 | .27 | .24 | .24 |
| 3 | 250 | .04 | .05 | .04 |
| 3 | 500 | .05 | .06 | .06 |
| 3 | 1,000 | .07 | .08 | .08 |
| 3 | 1,500 | .08 | .09 | .10 |
| 3 | 2,000 | .08 | .09 | .13 |
| 4 | 250 | .05 | .07 | .09 |
| 4 | 500 | .05 | .13 | .19 |
| 4 | 1,000 | .08 | .37 | .40 |
| 4 | 1,500 | .17 | .53 | .52 |
| 4 | 2,000 | .30 | .53 | .50 |
| 5 | 250 | .07 | .08 | .08 |
| 5 | 500 | .05 | .09 | .13 |
| 5 | 1,000 | .07 | .26 | .37 |
| 5 | 1,500 | .12 | .54 | .62 |
| 5 | 2,000 | .20 | .75 | .75 |
| 6 | 250 | .05 | .06 | .07 |
| 6 | 500 | .05 | .08 | .12 |
| 6 | 1,000 | .08 | .19 | .32 |
| 6 | 1,500 | .13 | .40 | .58 |
| 6 | 2,000 | .22 | .67 | .78 |
| 7 | 250 | .06 | .09 | .09 |
| 7 | 500 | .06 | .11 | .17 |
| 7 | 1,000 | .12 | .36 | .45 |
| 7 | 1,500 | .24 | .63 | .62 |
| 7 | 2,000 | .37 | .64 | .62 |
| 8 | 250 | .06 | .07 | .10 |
| 8 | 500 | .06 | .12 | .16 |
| 8 | 1,000 | .09 | .35 | .42 |
| 8 | 1,500 | .18 | .66 | .66 |
| 8 | 2,000 | .30 | .75 | .73 |

[1] C.p.s.=cycles per second.

By examining the above table it can be seen that the provision of an air space between the ceramic liner and the metal shell of the component improves the sound attenuation of the component, and that even the greater sound absorption is achieved by incorporating a glass fiber insulation mat in the air space, particularly in the mid-frequency (250 to 2000 c.p.s.) range. Similar results would be achieved using an actual manifold-muffler component.

The exact volume of the manifold-muffler will vary according to engine size, temperature of the exhaust gases, time the gases remain in the manifold-muffler, and other factors. If sound is not attenuated sufficiently in a given manifold-muffler, because of insufficient volume, or if a greater volume is required for control of smog-causing pollutants, then the exhaust pipe can be lined with the acoustical ceramic material of this invention, providing additional volume. The exact volume required for sufficient sound attenuation and smog control can be easily determined by simple experimentation.

In a preferred embodiment, used in connection with a 283 cubic inch engine, the manifold-muffler is lined with a ¼ inch thick ceramic liner backed by ¼ inch of glass fiber insulation, and the internal volume inside the liner is about 176 cubic inches.

The acoustical ceramic segments 50 or bodies, a single one of which is shown in perspective in FIG. 4, are composed of the insulating porous acoustical ceramic material of the instant invention.

In a preferred embodiment, this material is comprised of about 100 parts of fused silica having a coefficient of thermal expansion not greater than about $10 \times 10^{-7}$ per ° C., substantially all of the silica having a particle size of −20+50 mesh, U.S. Sieve Series; about 10 parts of an immiscible glass binder, and about 15 parts bentonite. The components are admixed, and sufficient water is added to make a mortar or paste of silica and the glass which is then poured into a mold or pressed (FIGS. 6 and 7) to the desired size and shape, allowed to set, then removed, dried and fired at 2300° F. for 2 hours to cause the immiscible glass to melt forming a binder for the fused silica. The size of the glass is desirably about −100+200 mesh, U.S. Sieve Series.

If it is desired to increase the porosity of the acoustical ceramic material, the size of the fused silica particles can be increased or sawdust can be added to the mixture. Upon firing of the mortar or paste, the sawdust is burned out leaving a more porous body.

Fused silica having a particle size of −20+50 mesh is used because the porosity of a body made therewith is such that optimum acoustical characteristics are achieved.

The porosity can also be controlled by varying the amount of fused silica material compressed into a particular volume of mold, i.e., greater pressure used to press the fused silica into a mold causes a less porous final product. It can also be controlled by varying the ratio of glass to fused silica of a particular particle size.

Particulate material other than fused silica can be used in the acoustical ceramic material of this invention, and glasses other than immiscible glass, as for example soda lime glass, Glass "A," Glass "B" or Glass "C," all subsequently identified, can be used as the binding agent. The glass should have a low coefficient of expansion. Whatever particulate material and binder are used, the particle size

---

[1] By pressing the composition of Example II, below, except as otherwise indicated to the desired thickness in an appropriately shaped mold, drying and firing to 2300° F. for one hour. In samples 4 through 8 the quantity of the composition charged was varied to cause variations in porosity.

and relative proportions between the particulate material and the binder must be such that the air flow through a ¼ inch thick body of the acoustical ceramic material having an area of substantially 6 square inches at a pressure differential of ½ inch water, is from about 2 to 35 cubic feet per minute, and the binder material, in the acoustical material, must be stable against softening and against combined devitrification and crystal growth at operating temperatures. In addition, the particulate material should preferably have a coefficient of thermal expansion not greater than $60 \times 10^{-7}$ per ° C., and substantially all of the particles should be between from about −10 to about +100 mesh U.S. Sieve Series in size. In general, the insulating porous acoustical ceramic material should contain as a dispersed phase from about 83% to about 96% by weight of the particulate material, and from about 4 to about 17% by weight of the vitreous binder, said percentages being based on the combined weight of the particulate material and binder.

In one preferred embodiment the particulate material has a coefficient of thermal expansion not greater than $35 \times 10^{-7}$ per ° C.

In another preferred embodiment the insulating porous acoustical ceramic material comprises at least about 95% of fused silica having a coefficient of thermal expansion not greater than about $10 \times 10^{-7}$ per ° C.

From the above, it becomes apparent that insulating porous acoustical ceramic material of this invention may be described more in terms of its parameters, rather than actual specific compositions. The following are examples of compositions which, however, have been found to be operable.

EXAMPLE II 100 parts fused silica (−20+50 mesh, U.S. Sieve Series).
10 parts glass (−100+200 mesh, U.S. Sieve Series).
15 parts bentonite (commercial grade).
25 parts water.

EXAMPLE III 100 parts fused silica (−50+100 mesh, U.S. Sieve Series).
10 parts glass (−100+200 mesh, U.S. Sieve Series).
15 parts bentonite (commercial grade).
25 parts water.

EXAMPLE IV 100 parts fused silica (−20+50 mesh, U.S. Sieve Series).
5 parts glass (−100+200 mesh, U.S. Sieve Series).
15 parts bentonite (commercial grade).
25 parts water.

Porous, ceramic insulating bodies have been made from the compositions set forth in Examples II, III and IV by pressing or casting to a desired shape, drying, and firing, e.g., at 2300° F. for one hour.

The preferred particulate material is fused silica. Other operable particulate materials include, for example titania crystals, zirconia crystals and alumina.

Examples of preferred materials for use as the binder component of the acoustical ceramic material of this invention are soda-lime glass and immiscible glasses. By "immiscible" is meant a glass which contains two distinct phases. Immiscible glass is also known as "two-phase" glass. Other suitable binder materials include glasses which have been designated "A," "B," "C," and "D"

glass having the composition in weight percent indicated below:

| "A" | "B" | "C" | "D" |
|---|---|---|---|
| $SiO_2$, 52–55 | $SiO_2$, 63.5–66.5 | $SiO_2$, 65.0 | $SiO_2$, 60–80. |
| MgO, 0–5 | $Al_2O_3$, 2.5–5.5 | MgO, 10.0 | MgO, up to 15. |
| $Al_2O_3$, 13–16 | CaO, 12–16 | | $Al_2O_3$, up to 20. |
| CaO, 17–22 | MgO, 1–35 | $Al_2O_3$, 25.0 | PbO, up to 10. |
| $B_2O_3$, 6–8 | $Na_2O$, 6.5–10 | | $B_2O_3$, 5–30. |
| | $B_2O_3$, 3.5–7 | | CaO and alkali metal oxides, minor amounts. |

In the above composition, the bentonite is used to provide "green strength" to give shape to the segment before firing, and it also serves as a lubricating aid to enable the wet solution to be poured into molds more easily. Other clays than bentonite are also suitable. Such clays are montmorillonite, kaolin, and other similar ones. Any clay which would provide "green strength" would be suitable. The commercial grades of these clays are suitable for use in the composition of this invention. Desirably the clay is present in a quantity ranging from about 4 to about 19% by weight of the dry product.

The inclusion of small amounts of stearates, i.e., Zn, Mg, Ca, and Li stearate, has also been found to aid lubrication. These materials can be added in small amounts, usually from about 1 to about 5% by weight of the final product.

Preferably the coefficient of thermal expansion of the particulate material is not greater than about $15 \times 10^{-7}$ per ° C., but materials having a coefficient of thermal expansion not greater than about $60 \times 10^{-7}$ per ° C., are operable. If the coefficient of thermal expansion of the particulate material is greater than the indicated limits, then the insulating porous acoustical ceramic material is much more subject to cracking due to the thermal stress and expansion encountered in engine operation, rendering the material essentially useless.

The insulating porous acoustical ceramic materials of this invention have excellent insulating and acoustical properties and will not crack under the thermal stress while in use.

EXAMPLE V

A combination manifold-muffler was prepared for a 283 cubic inch V-8 engine. The manifold-muffler was prepared by making three cylindrical segments of the insulating porous acoustical ceramic material of this invention, and cementing them together end to end. End caps of the same material were cemented on the outer ends of the two outer segments, and appropriate holes cut in the cylinder for exhaust risers, and exhaust outlet. The ceramic cylinder was placed inside a metal shell which was lined with approximately ¼ inch thick glass fiber insulation, and the apparatus attached to the engine and exhaust pipe.

The manifold-muffler had four exhaust risers, one riser to receive the exhaust gases from cylinders 1, 2, 3, and 4.

To demonstrate the insulating characteristics of the insulating porous acoustical ceramic liner of this invention with a glass fiber insulation backing, thermocouples were attached at various points to the outside shell of the combination manifold-muffler described above and to the exhaust pipe (unlined). The temperature was measured at various times and at various speeds while the automobile was being driven a total of 2,280 miles. The initial mileage of the car when the test began was 41,340. The points of attachment of the thermocouple were as follows:

(1) T.C.[1]—Forward end of shell.
(2) T.C.—On back of shell opposite No. 1 cylinder exhaust riser.
(3) T.C.—On back of shell opposite No. 2 and No. 3.
(4) T.C.—On back of shell opposite No. 4 cylinder exhaust riser.
(5) T.C.—Rearward end of shell.
(6) T.C.—Exhaust pipe.

[1] T.C.=thermocouple.

The test results are as follows:

TABLE II

| Test | Mileage | Condition (m.p.h.) | Temperature, °F. | | | | | |
|---|---|---|---|---|---|---|---|---|
| | | | No. 1 | No. 2 | No. 3 | No. 4 | No. 5 | No. 6 |
| 1 | 41,340 | Idle | 175 | 295 | 295 | 315 | 310 | 370 |
| | | 35 | 130 | 215 | 215 | 280 | 260 | 425 |
| | | 50 | 120 | 220 | 220 | 300 | 265 | 475 |
| | | 60 | 130 | 255 | 255 | 350 | 360 | 660 |
| 2 | 41,835 (Total 495). | Idle | 160 | 270 | 270 | 285 | 295 | 320 |
| | | 35 | 115 | 210 | 195 | 270 | 265 | 380 |
| | | 50 | 120 | 235 | 225 | 315 | 270 | 500 |
| | | 60 | 125 | 230 | 230 | 330 | 280 | 605 |
| 3 | 42,092 (Total 752). | Idle | 160 | 265 | 265 | 270 | 290 | 320 |
| | | 35 | 130 | 220 | 205 | 265 | 250 | 370 |
| | | 50 | 110 | 210 | 205 | 280 | 250 | 500 |
| | | 60 | 130 | 215 | 220 | 300 | 290 | 605 |
| 4 | 42,255 (Total 915). | Idle | 90 | 205 | 235 | 225 | 240 | 295 |
| | | 35 | 90 | 210 | 205 | 280 | 260 | 380 |
| | | 50 | 95 | 215 | 220 | 285 | 270 | 480 |
| | | 60 | 95 | 200 | 200 | 265 | 250 | 560 |
| 5 | 43,024 (Total 1,684). | Idle | 195 | 270 | 260 | 285 | 305 | 320 |
| | | 35 | 200 | 225 | 200 | 275 | 275 | 365 |
| | | 50 | 190 | 220 | 210 | 280 | 270 | 520 |
| | | 60 | 230 | 250 | 215 | 300 | 285 | 575 |
| 6 | 43,620 (Total 2,280). | Idle | 150 | 170 | 140 | 140 | 195 | 340 |
| | | 35 | 190 | 230 | 185 | 235 | 260 | 400 |
| | | 50 | 200 | 240 | 200 | 210 | 265 | 441 |
| | | 60 | 215 | 295 | 250 | 325 | 315 | 665 |

It can thus be seen that the insulating porous acoustical ceramic liners of this invention when backed by a mat of glass fiber insulation materially reduce the temperatures of the metal shell as compared to the unlined exhaust pipe. This is even more significant when it is known that gases entering the manifold-muffler from the cylinders often reach 1600° F. or more. By way of comparison a conventional unlined cast iron manifold will reach temperatures ranging from 500–1300° F. depending on the load and speed of the engine. The liner thus prevents the shell from becoming a heat sink to draw heat out of the gases, which prevents secondary combustion from occurring. It also prevents the shell from being damaged due to warping and rusting. Comparable results can be obtained if the liner is used alone without the glass fiber backing.

Heretofore, this invention has been described in terms of an insulating porous acoustical ceramic liner which not only keeps the temperature of exhaust gases higher in the exhaust system in order that secondary combustion might occur, but it also, because of its acoustical properties, serves to muffle engine noise, thus obviating the necessity for a conventional muffler and making possible the combination manifold-muffler described herein. If either one of these two characteristics were to be sacrificed, however, in a first embodiment an insulating ceramic material could be provided for lining conventional exhaust manifolds in order to maintain hotter exhaust gases thereby promoting secondary combustion, or in another embodiment, a liner for a conventional muffler would be provided having excellent acoustical properties but having diminished resistance to thermal stress. This invention in intended to encompass both of these additional embodiments.

In the insulating porous acoustical ceramic material describer heretofore, the acoustical properties were achieved by regulating the particle size of the particulate material, as reflected in the porosity of the product. Thus, in order to achieve the proper porosity, the fused silica particle size was preferably limited to −20+50 mesh. If it is desired, however, to sacrifice the acoustical properties and simply make an insulating ceramic liner for use in a conventional exhaust manifold, the particle size limitations need not be observed. Thus an insulating ceramic material can be made by admixing a suspension of fused silica or other particulate material with a suitable vitreous binder and clay, forming a segment in a mold or press and thereafter firing the composition. The particle size of the fused silica would desirably be less than about 200 mesh, ranging down to colloid size. The same composition proportions would apply as had already been described. An example of such a composition would be:

EXAMPLE VI 100 parts fused silica (less than 200 mesh, U.S. Sieve Series).

10 parts soda-lime glass (−100+200 mesh, U.S. Sieve Series).

15 parts bentonite (commercial grade).

A conventional exhaust manifold 62 is shown in FIG. 8 lined with an insulating ceramic liner 64 formed of minus 200 mesh fused silica. This liner has good thermal stability and will not crack under stress. It provides excellent insulating properties maintaining the temperature of the exhaust gases hotter and the temperature of the manifold shell far lower than it would be were it not lined.

The thermal stability of the insulating porous acoustical ceramic liner described herein is due primarily to the limited fused silica particle size specified. That is, if larger particle size fused silica were used a greater proportion of glass would be required in order to get proper bonding. Due to the greater proportion of glass the thermal expansion coefficient of the finished composite would be increased and the product would not be able to stand up under use conditions. Although the liner would not be effective at extremely high temperatures, it would still maintain its acoustical properties. Thus for applications where great thermal stability is not needed, such as a muffler, an acoustical ceramic material could be provided having larger fused silica particle size than −10 mesh. Such a liner 66 is shown in FIGS. 9 and 10 lining a conventional muffler 28. Examples of such liners would be:

EXAMPLE VII 100 parts fused silica (⅛ inch ave. diameter).

20 parts Pyrex glass (−100+200 mesh U.S. Sieve Series).

15 parts bentonite (commercial grade).

EXAMPLE VIII 100 parts fused silica (−6+10 mesh, U.S. Sieve Series).

25 parts Glass "C" (−100+200 mesh, U.S. Sieve Series).

15 parts bentonite (commercial grade).

EXAMPLE IX 100 parts fused silica (−6+10 mesh, U.S. Sieve Series).

30 parts Glass "B" (—100+200 mesh, U.S. Sieve Series).
10 parts montmorillonite.

EXAMPLE X 100 parts fused silica (—5+6 mesh, U.S. Sieve Series).
26 parts immiscible glass[1] (—100+200 mesh, U.S. Sieve Series).
15 parts bentonite.

[1] The glass used had the following analysis in percent by weight: $SiO_2$, 70; $B_2O_3$, 25; BaO, 5.

EXAMPLE XI 100 parts fused silica (—6+7 mesh, U.S. Sieve Series).
20 parts "C" glass (—100+200 mesh, U.S. Sieve Series).
5 parts bentonite (commercial grade).

As stated above, if larger than about 10 mesh particle size is being used, then a greater proportion of glass is needed in order to bind the particulate material properly. Thus, desirably in this instance, the particulate material is present from about 74 to about 84% by weight, and the binder about 16 to 26% by weight, the percentages being based on the combined weight of the particulate material and glass binder.

Liners formed of the above compositions have good acoustical properties and will stand up under thermal conditions encountered in conventional mufflers. The maximum allowable fused silica particle size can be determined by simple experimentation. The preferred particle size for the above application, however, is —6+10 mesh, U.S. Sieve Series.

The upper limit on the fused silica, or other particulate material particle size will be dictated by the amount of thermal stability desired in the end product. That is, a point will be reached whereby a particle size is used that will result in a product which is not thermally stable to temperatures in a muffler. What that particle size is will vary from particulate material to particulate material, but can easily be determined by simple experimentation. If too large particles are used, then too large a quantity of glass will be required with a resultant decrease in compressive strength.

What I claim is:

1. An insulating porous acoustical ceramic material consisting essentially of as a dispersed phase from about 83% to about 96% by weight of particulate fused silica having a coefficient of thermal expansion not greater than about $10 \times 10^{-7}$ per ° C., substantially all of said fused silica having a particles size from about —10 to about +100 mesh, U.S. Sieve Series, and from about 4% to about 17% by weight of a binder selected from the group consisting of soda-lime glass and borosilicate glass adhering together the particles of said fused silica in a porous mass, said percentages being based on the combined weight of the fused silica and binder, the particle siz in relative proportions between said fused silica and said binder being such that the air flow through a ¼ inch thick body of the acoustical ceramic material having an area of substantially 6 sq. inches at a pressure differential of ½ inch water is from about 2 to 35 cubic feet per minute, said binder upon heating of said acoustical ceramic material to a temperature as high as 2000° F. being stable against combined devitrification and crystal growth.

2. An acoustical ceramic material as claimed in claim 1 wherein said vitreous binder is a soda-lime glass.

3. An acoustical ceramic material as claimed in claim 1 wherein said borosilicate glass consists of 70% $SiO_2$, 25% $B_2O_3$, and 5% BaO.

4. A substantially non-porous insulating ceramic material consisting essentially of as a dispersed phase from about 83% to about 96% by weight of particulate fused silica having a coefficient of thermal expansion not greater than about $10 \times 10^{-7}$ per ° C., substantially all of said fused silica having a particle size less than about 100 mesh, U.S. Sieve Series, and from about 4% to about 17% by weight of a binder selected from the group consisting of soda-lime glass and borosilicate glass adhering together the particles of said fused silica in a substantially non-porous mass, said percentages being based on the combined weight of the fused silica and binder, said binder upon heating of said acoustical ceramic material to a temperature as high as 2000° F. being stable against combined devitrification and crystal growth.

5. A ceramic material as claimed in claim 4 wherein said vitreous binder is borosilicate glass.

6. A ceramic material as claimed in claim 4 wherein said borosilicate glass consists of 70% $SiO_2$, 25% $B_2O_3$, and 5% BaO.

7. A porous acoustical ceramic material consisting essentially of as a dispersed phase from about 74% to about 84% by weight of particulate fused silica having a coefficient of thermal expansion not greater than about $10 \times 10^{-7}$ per ° C., substantially all of said particulate material having a particle size from about —6 to about +10, mesh, U.S. Sieve Series and from about 16% to about 26% by weight of a binder selected from the group consisting of soda-lime glass and borosilicate glass adhering together the particles of said fused silica in a porous mass, said percentages being based on the combined weight of the fused silica and binder, the particle size in relative proportions between said fused silica and said binder being such that the air flow through a ¼ inch thick body of the acoustical ceramic material having an area of substantially 6 sq. inches at a pressure differential of ½ inch water is from about 2 to 35 cubic feet per minute, said binder upon heating of said acoustical ceramic material to a temperature as high as 2000° F. being stable against combined devitrification and crystal growth.

8. An acoustical ceramic material as claimed in claim 7 wherein the particulate material comprises at least about 95% of fused silica and has a coefficient of thermal expansion not greater than about $10 \times 10^{-7}$ per ° C.

9. An acoustical ceramic material as claimed in claim 7 wherein said vitreous binder is a soda-lime glass.

10. An acoustical ceramic material as claimed in claim 7 wherein said borosilicate glass consists of 70% $SiO_2$, 25% $B_2O_3$, and 5% BaO.

References Cited

UNITED STATES PATENTS

| | | | |
|---|---|---|---|
| 3,219,466 | 11/1965 | Isherwood | 106—69 X |
| 3,231,401 | 1/1966 | Price et al. | 106—69 X |
| 3,233,697 | 2/1966 | Slayter et al. | 252—62 X |
| 3,301,635 | 1/1967 | Bergna et al. | 106—69 X |
| 3,314,758 | 4/1967 | Scott et al. | 106—69 X |

OTHER REFERENCES

Lange, N. C.: Handbook of Chemistry, 8th ed., 1952, p. 825.

LEON D. ROSDOL, Primary Examiner

I. GLUCK, Assistant Examiner

U.S. Cl. X.R.

181—33; 106—69, 54, 52; 117—97, 129, 135.1